United States Patent
Jenkins et al.

(10) Patent No.: US 6,264,104 B1
(45) Date of Patent: *Jul. 24, 2001

(54) VENDING DEVICE WITH REMOTE ELECTRONIC SHOPPING FACILITY

(75) Inventors: Alan Ernest Jenkins, Pearcedale; Siegmund Grondman, Upwey; Gower Smith, Kirribilli; Tony Bruck, East Lindfield, all of (AU)

(73) Assignee: Imaging Technologies Pty Limited, Crows Nest (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/716,426
(22) PCT Filed: Mar. 21, 1995
(86) PCT No.: PCT/AU95/00154
  § 371 Date: Nov. 25, 1996
  § 102(e) Date: Nov. 25, 1996
(87) PCT Pub. No.: WO95/26004
  PCT Pub. Date: Sep. 28, 1995

Related U.S. Application Data (63) Continuation-in-part of application No. 08/387,715, filed as application No. PCT/AU93/00416 on Aug. 13, 1993, now Pat. No. 6,029,851.

(30) Foreign Application Priority Data

Mar. 21, 1994 (AU) .................................................. PM4610

(51) Int. Cl.[7] ..................................................... G06K 15/00
(52) U.S. Cl. ........................... 235/383; 235/380; 235/379
(58) Field of Search ................................ 235/379, 380, 235/383; 705/27; 380/25; 395/712

(56) References Cited

U.S. PATENT DOCUMENTS

| | | | |
|---|---|---|---|
| 4,598,810 | 7/1986 | Shore et al. | 194/205 |
| 4,884,212 | 11/1989 | Stutsman | 364/479 |
| 4,896,024 | 1/1990 | Morello et al. | 235/381 |
| 4,947,028 | 8/1990 | Gorog | 235/381 |
| 4,961,507 | 10/1990 | Higgins | 221/129 |
| 4,992,940 | 2/1991 | Dworkin | 364/401 |

(List continued on next page.)

FOREIGN PATENT DOCUMENTS

| | | |
|---|---|---|
| WO 90/11572 | 10/1990 | (WO) . |
| WO 92/06438 | 4/1992 | (WO) . |
| WO 94/28497 | 12/1994 | (WO) . |
| WO 95/04333 | 2/1995 | (WO) . |
| WO 95/15533 | 6/1995 | (WO) . |

*Primary Examiner*—Karl D. Frech
(74) *Attorney, Agent, or Firm*—Marshall, O'Toole, Gerstein, Murray & Borun (57) ABSTRACT

A dedicated electronic catalogue device (150) and a dedicated system for providing goods/services ordered by the electronic catalogue device (150) from a remote location stores in memory (400) a catalogue database which can be accessed by a user by actuation of an appropriate input interface (500) for the user to select a particular product or service to be provided by a provider. A host device (300) at the location of the provider communicates with the electronic catalogue device (150) and obtains transaction information relating to the user's order. The provider then fills the order and provides the appropriate product or service. The dedicated electronic catalogue devices (150) can be provided at any convenient location such as a public location, for example. Any product or service is available which can be supplied by the provider. The catalogue can be updated remotely from the host (300) to update product or service information.

38 Claims, 7 Drawing Sheets

U.S. PATENT DOCUMENTS

| | | | |
|---|---|---|---|
| 4,995,498 | 2/1991 | Menke | 194/205 |
| 4,997,076 | 3/1991 | Hirschfeld et al. | 194/212 |
| 5,020,958 | 6/1991 | Tuttobene | 414/281 |
| 5,133,441 | 7/1992 | Brown | 194/211 |
| 5,139,384 | 8/1992 | Tuttobene | 414/281 |
| 5,273,183 | 12/1993 | Tuttobene | 221/7 |
| 5,303,844 | 4/1994 | Muehlberger | 221/1 |
| 5,319,542 | 6/1994 | King, Jr. et al. | 364/401 |
| 5,377,864 | 1/1995 | Blechl et al. | 221/2 |
| 5,385,265 | 1/1995 | Schlamp | 221/7 |
| 5,402,336 | 3/1995 | Speigelhoff et al. | 364/401 |
| 5,467,892 | 11/1995 | Schlamp | 221/7 |
| 5,469,206 * | 11/1995 | Stube et al. | 348/7 |
| 5,528,490 * | 6/1996 | Hill | 395/712 |

* cited by examiner

VENDING DEVICE WITH REMOTE ELECTRONIC SHOPPING FACILITY

RELATED APPLICATION

This patent is a continuation-in-part of prior U.S. application Ser. No. 08/387,715, now U.S. Pat. No. 6,029,851. U.S application Ser. No. 08/387,715 is the U.S. national stage of PCT/AU93/00416, filed Aug. 13, 1993 and having a priority date of Aug. 14, 1992.

The present invention relates generally to electronic ordering of goods and/or services and in particular relates to a dedicated electronic catalogue device and system for enabling remote ordering of goods/services.

In a further aspect, the invention relates to an electronic catalogue device which combines a remote ordering facility with a local vending facility, for vending locally available goods.

The disclosure of the applicants earlier international (PCT) application, number PCT AU93/00416 (publication number WO94/04446) is considered incorporated herein. This earlier application relates to a recycling apparatus for promoting the recycling of complex items, such as toner cartridges, ink jet cartridges and the like.

Remote electronic ordering of goods/services is known. Systems area available where a user having access to a personal computer (PC) may order a limited number of goods of services from remote location, e.g. "remote shopping" from the supermarket.

The extend of available systems is limited and they have a number of disadvantages.

A catalogue "data base" is usually provided to the PC user on data storage media such as diskette, CD-ROM, or the like. The user accesses the information on the catalogue via his PC and selects the goods he requires. The PC will then print out an order form, which is then usually sent to the service provider by transmission media such as facsimile, post or the like. Such systems are merely a logical extension of known paper catalogue marketing techniques. The PC is merely a convenient interface for reading the catalogue and generating printed orders.

Further a separate accounting system is necessary to process the user's order. Further, it is quite possible than an unauthorized user of the PC may make an order which would unknowingly be charged to the owner/authorised user of the PC.

Known electronic catalogue systems are generally an extension of an existing computerised ordering and administration system and may be quite difficult to use for people unfamiliar with computers. Further, present systems have no means of storing high priority goods on site and delivering them to the user instantly. It is necessary to transmit order information to a remote warehouse or delivery centre. Known systems are merely concerned with the delivery of new or replacement articles and have no means for processing the administrative requirements for collection and storage of used articles, such as recyclable materials.

Further, they do not provide untrained users sufficient assistance to replace the need to make phone enquires upon the supplier to find out what products they should order for the particular application requirement. For example, there are no electronic catalogues for laser printer, ink jet printer, dot matrix printer, photocopiers, facsimile machines and multi-functional office machines, that guide the user through the compatibility lists allowing selection by brand, model, type, or any other meaningful access method.

The present invention provides a dedicated electronic catalogue device for enabling a user to order goods and/or services from a remote location, including a memory storing a catalogue data base for access by the user, the catalogue data base including information on products and/or services available for order, display means for displaying information from the catalogue data base, communication means for communicating with a remote host device for automatically placing orders, identification means for identifying authorised users of the device, user input means for enabling the user to select available products and/or services from the catalogue data base for order, and processing means for controlling operation of the device.

The electronic catalogue device of the present invention is a dedicated device which is preferably suitable for use by a plurality of different users.

The electronic catalogue device is preferably positioned in a public location. That is, a location which is accessible to service a plurality of users. For example, such an electronic catalogue device may be located in the foyer of an office building, to enable access by people throughout the office building.

Preferably, each user is provided with an identification means, preferably in the form of a magnetic card, although any other type of identification means, such as a "pin" number, token, smartcard, finger print, etc., could be used.

The device is available for any user in the building to order goods or services, merely by accessing the device by presentation of his identification means and then proceeding to make an order. The goods/services available will be determined by the availability of goods/services at the remote location. Generally, any goods or services for which there is a demand, or for which there is envisaged there may be a demand, may be proffered.

The catalogue data base provides information on all the products/services available. The data base is preferably organised in the form of a "family tree". The head of the tree comprises more generic information on a product and the limbs of the tree provide more detailed information. This arrangement facilitates selection of the appropriate product even where the user does not have a detailed knowledge of the product range available to him.

The device is preferably arranged to store information relating to orders made by a user as "transaction information". The device is preferably arranged to communicate with the host device at predetermined intervals and upload the transaction information to the host device during the communication. In response, the host device preferably generates an invoice and a delivery authority or order which will prompt delivery of the ordered product/service and updating of the user's account. The host is preferably associated with a service infrastructure to enable delivery of the goods/services and keeping of user accounts.

The electronic catalogue device also preferably stores user information in a user data base, including information for identifying authorised users. This information may be used to confirm the identity of a user accessing the device, and may also be uploaded in the transaction file to the host device so that the host can identify the user who has placed the particular order.

The catalogue device preferably has access locally to credit information to determine the credit worthiness of a user and may deny a user order if the credit of the user is not sufficient. Preferably, user credit information is stored in the user data base and the device is arranged to automatically update the user credit information in response to orders placed by the user. User credit information may also be updated remotely from the host device via the communication means, e.g. in response to payment of invoices.

The host device is also preferably arranged to update data stored in the electronic catalogue device. For example, the catalogue data base may be updated with further information on new products (goods/services) available, or products which are no longer available or temporarily unavailable. User data may also be updated. For example, where it is necessary to identify a new user of the device, new user data will be added to the user data base.

In a preferred embodiment, the electronic catalogue device also provides information services. For example, a weather report may be provided, an international news report, educational services, and other information services. Data relating to these information services is stored in the memory in an information service file. The information service files may also be remotely updated by communications from the host device. Audio and video files may be used to supplement the information services. The electronic catalogue device is preferably provided with audio reproduction means to enable reproduction of an audio file. The display means preferably enables reproduction of a video file.

The advantages of a system such as this are significant. Any products/services may be offered for sale at a location convenient for targeted users. For example, if an office worker requires lunch, all he need do is access his local device with his identification means and order lunch. The appropriate service would be provided. Similarly, should office hardware be required, e.g., toner cartridges, ink cartridges, other office materials etc., all the user need do is access the device and make the appropriate order.

It will be appreciated that the device has general application and is not limited to office users.

Communication between the electronic catalogue device or devices and the host device may be via any convenient communication media. Preferably both the host and electronic catalogue device are provided with a MODEM for automatic communication via a telephone link. Other suitable data carriers may be used as an interface, such as electronic data interchange (EDI).

In a preferred embodiment, a local vending facility is also provided. In this embodiment, therefore, not only can the device offer a remote ordering facility, but can also vend any goods which may be available locally, i.e., from storage means provided with the device. The user accesses the device and the device is preferably arranged to indicate, by means of the visual display unit what goods are available locally and what goods are available remotely. The user can then select his preferred goods.

A preferred embodiment has a collection function for crediting and signaling the requirement to collect articles from the user site, such as recyclable or damaged goods. Storage means are preferably provided for storing articles returned by users whether for recycling or for other purposes. The device may be arranged to automatically signal the host device at the remote area for the requirement for article collection and is preferably automatically arranged to credit the users account with any amounts due to the user because of placement of recyclable articles in the storage means.

In particular, a preferred embodiment of the invention is intended for electronic sales and recycling of complex office items, such as ink jet cartridges, photocopier and fax cartridges etc. The device enables easy selection/cross referencing for toner cartridges, ink jet cartridges, etc, with the users identity and account, together with an electronic catalogue ordering/dispensing system for complex office items and any other goods. The system, in at least preferred embodiments, can replace the need to have a sales representative to determine user needs, such as what type of cartridge fits the user laser printer, and the need for that user to order the cartridge in a separate transaction. The device acts as a "one-stop shop" and preferably determines credit details, security levels, pricing, delivery and billing.

In yet a further embodiment, the device of the present invention is associated with a recycling and vending apparatus, such as disclosed in applicants earlier PCT application, referenced above.

The present invention further provides a dedicated remote goods/services ordering and supply system, comprising an electronic catalogue device as discussed above, and a host device located at a remote location and arranged to communicate with the electronic catalogue device via the communication means, to receive orders for goods/services placed via the electronic catalogue device and process the orders.

The host device is preferably arranged to process an order by receiving transaction information via the communication means and automatically producing an invoice and delivery instruction for delivery of the products to the user who generated the order at the electronic catalogue device.

The present invention further provides a method of providing for remote ordering and supply of goods/services, comprising the step of providing, at a first location, a processing device incorporating a memory storing a catalogue data base including information on products and/or services available for order, and having input means to enable a user to select available products and/or services from the catalogue data base for order, providing, at a second location remote from the first location, a host device, the host device being arranged to communicate with the processing device to receive and process information relating to products/services ordered, and providing a service infrastructure for delivering products/services ordered to the first location.

The host device and the electronic catalogue device are preferably as discussed above.

The system as a whole preferably comprises a plurality of electronic catalogue devices connected by a communications link to a host device at a service centre for servicing product requests made at the electronic catalogue devices.

Features and advantages of the present invention will become apparent from the following description of an embodiment thereof, by way of example only, with reference to the accompanying drawings, in which.

Figure 1:
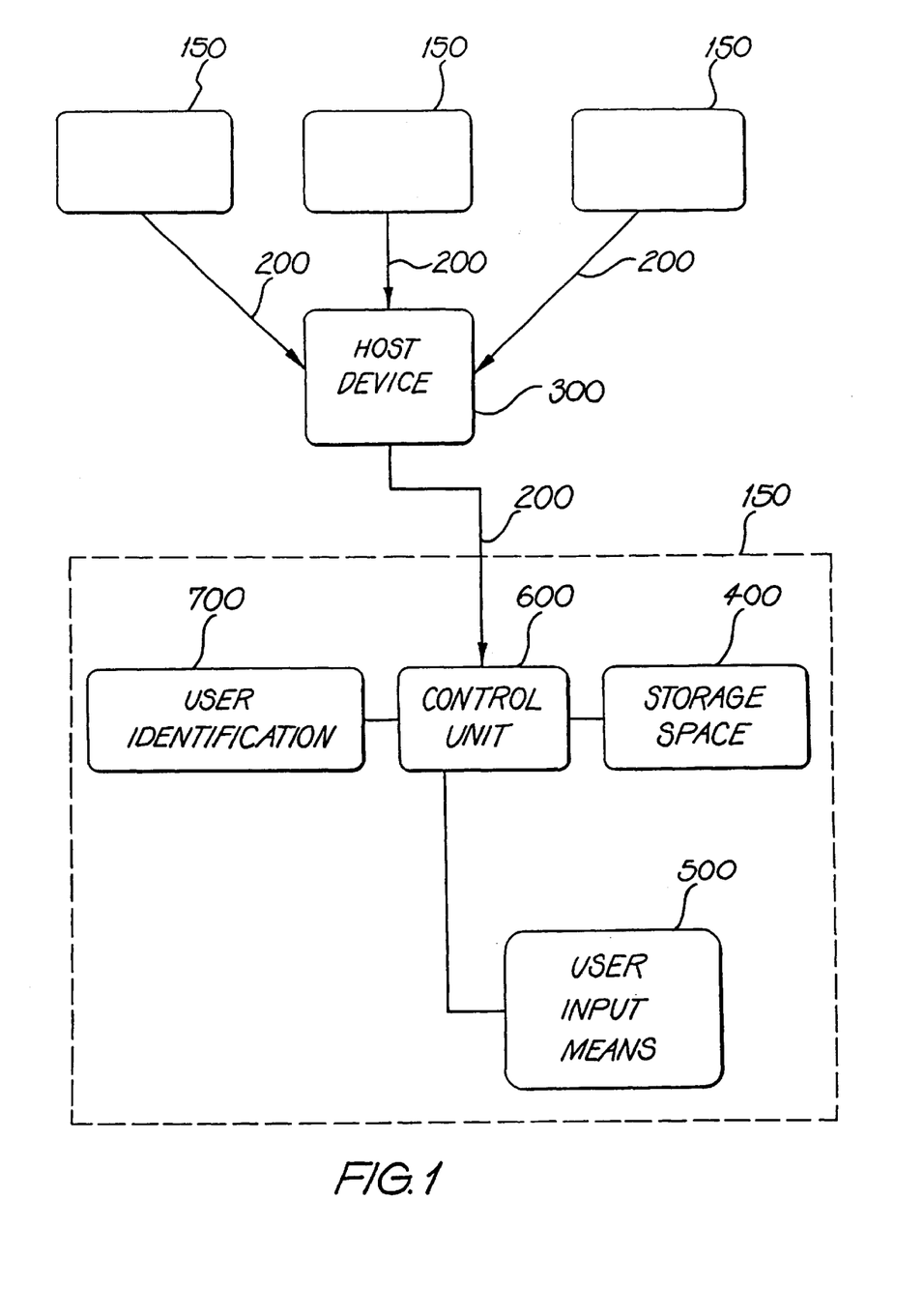
FIG. 1 is a schematic block diagram illustrating generally a system in accordance with an embodiment of the present invention and including an electronic catalogue device in accordance with an embodiment of the present invention.

Referring to FIG. 1, a remote electronic ordering system is schematically illustrated, including a plurality of electronic catalogue devices 150 connected to a host device 300 by a communications link. The communications link is preferably by way of respective MODEMS and a telephone link, but may be by any type of communications interface.

As illustrated, each electronic catalogue device comprises a user input means 500, adapted to enable a user to select available goods/services for order, a user identification means 700 for identifying a user of the device and a control unit 600 for controlling the ordering of ordered goods/services from the remote location where the host device 300 is situated.

In this embodiment, the electronic catalogue device 150 further comprises storage space 400 which may store articles to be vended locally by the device and provide space for the storage of articles provided by the user for recycling (see applicants earlier PCT application, referenced above).

Figure 2:
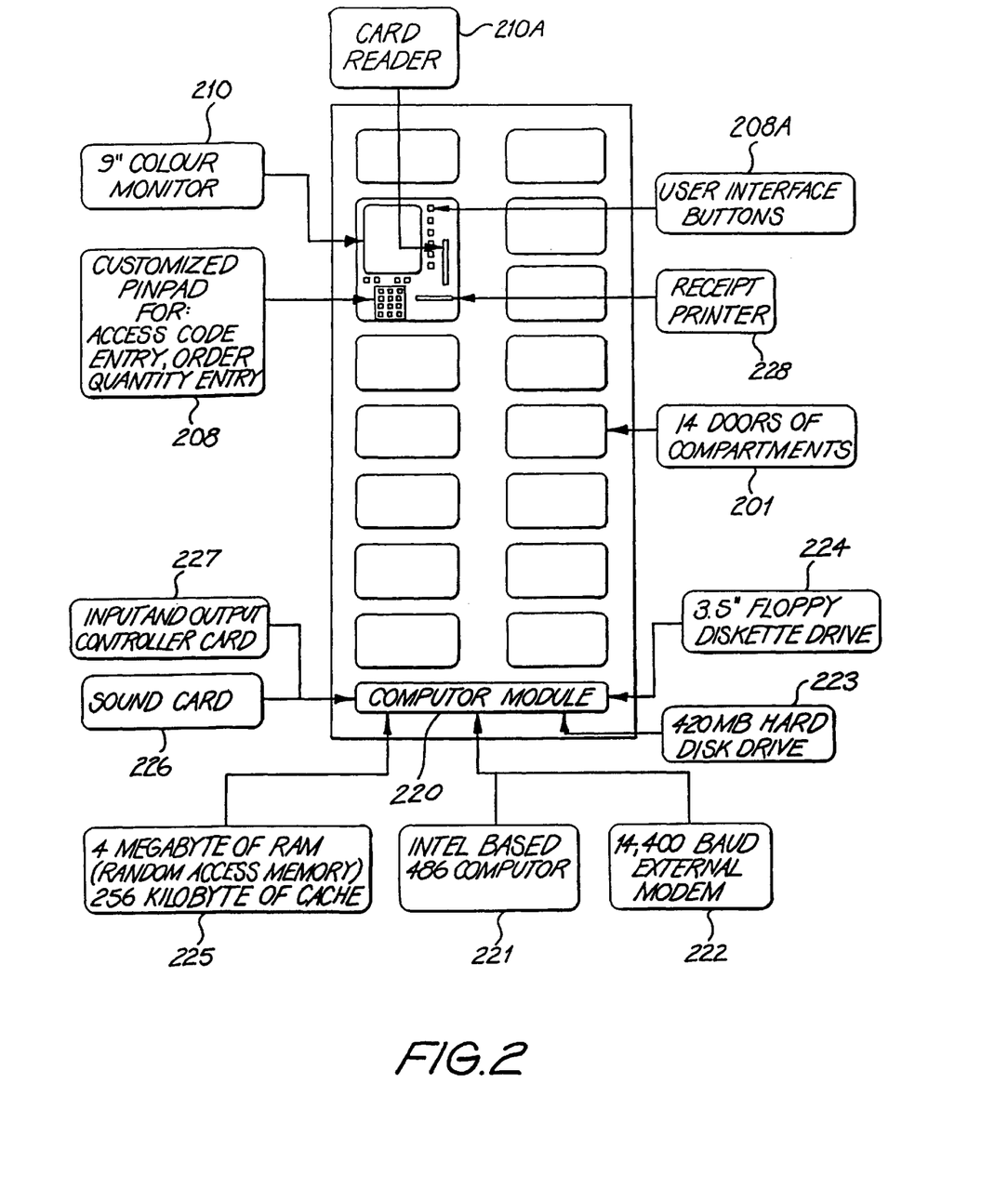
FIG. 2 is a front elevation of an electronic catalogue device in accordance with an embodiment of the present invention schematically indicating major components.

A front elevation of an embodiment of the electronic catalogue device is shown in FIG. 2. In this embodiment, the input means comprises a keyboard dedicated for operation of the device, 208, 208A. A magnetic card reader 210A is provided for user identification 700. A VDU (visual display unit) 210 is provided to give information to the user relating to products to be ordered, storage of products and dispensing of products.

The storage means are in the form of compartments 201, each having a separately lockable door. It will be appreciated that the storage means could have many other configurations (see applicants earlier PCT application). The device also mounts s computer module 220 which provides the control unit 600. The computer module 220 is inside the cabinet and inaccessible to the user except via the user input means. Components of the computer module 220 are schematically illustrated. A person skilled in the art will be able to realise an appropriate configuration of the computer module 220 components from this description. Computer module 220 comprises an INTEL based 486 processor 221; a 14,400 baud external modem 222 for communication with the host device 300; 420 MB hard disc drive 223, 3.5 inch floppy diskette drive 224 and 4 megabyte of RAM 225, constituting a memory for the control unit 600; a sound card 226 for the reproduction of audio files as audio information (audio files and audio computer technology are known. A suitable audio means must be provided to reproduce sound. A speaker is provided in the unit 150, although it is not shown in the drawing); an input and output controller card 227 for receiving signals indicative of products being removed from and placed in the compartments 201 (disclosure of detectors for detecting the opening of a compartment door and the placing of a product therein or removal of a product therefrom are disclosed in the above-mentioned PCT application and no further description will be given herein). The input and output controller card 227 detects whether a product is returned or removed from a compartment and provides appropriate signals to the processor 221. A receipt printer 228 is also provided for printing user receipts.

The keypad 208, 208A, may be any convenient type of keypad which will enable a user to carry out operation of the device in accordance with the following description. Generally, it will comprise numeric keys 0 to 9, scroll keys, to enable scrolling of a display appearing on the screen 210 and selection keys 208A to make a selection of a particular item appearing on the screen next to the particular key 208A.

The host device 300 (not shown in detail) comprises a personal computer positioned at a service location for processing data from the electronic catalogue device and sending data to the electronic catalogue device, in accordance with the following description. It includes a MODEM for communication with the electronic catalogue device, a 486 based computer, a printer for generating invoices and orders, a user interface to enable a service provider to input data, a display, means for transmitting audio files and (if required) video files to an electronic catalogue device, and appropriate memory means. The host 300 will be able to be configured by a skilled person to perform the functions detailed in this description.

The electronic catalogue device is preferably established in a convenient location. The location may be public, such as a retail shop, a foyer of an office building, or, in a large office, in the office itself.

Figure 3:
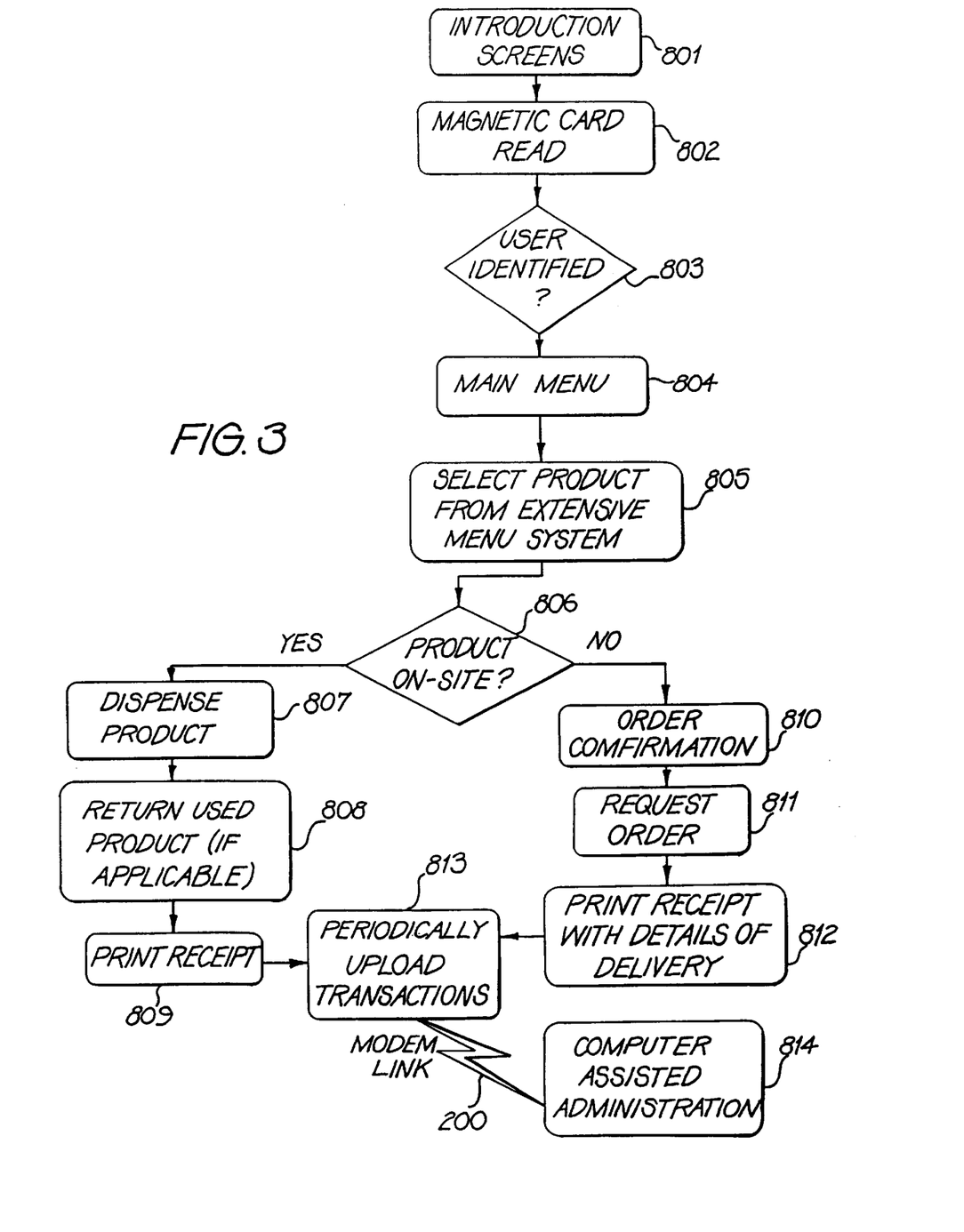
FIG. 3 is flow chart illustrating, generally, operation of a system and device in accordance with an embodiment of the present invention.

Operation of the device will now be described generally with reference to FIG. 3. More detailed operation will be described subsequently.

The control unit 600 is adapted to control the display unit 210 to produce a number of screens, depending upon user operation of the device 150. As an initial step, an "introduction screen" 801 is displayed on VDU 210. The introduction screen may give information to the user as to how to access the device, e.g., where to place hid identification means in order to proceed with a transaction.

After reviewing the introduction screen 801, the user proceeds to step 802 and inserts his magnetic card into card reader 210A, to enable the device 150 to identify him.

After the user has been identified 803, the control unit 600 controls the VDU 210 to display a "main menu" 804. This may comprise a single screen or a number of screens through which the user may scroll, providing the user with a number of choices of goods/services available for order, and may indicate whether goods are "on-site" in storage locations 201 or only available from remote site. Alternatively, this indication may not be given until later on in operation of the device 150. The display preferably provides high definition graphical images of catalogue products.

In the next step 805, the user selects the product he requires (either goods/services or both) by actuation of the keyboard 208. Control means 600 makes a determination as to whether the product is available locally or remotely, step 806.

If the product is available locally, in the next step 807 the product is dispensed from one of the storage location 201, the control unit 600 operating a latch mechanism to the particular storage location 201 to enable the user to open the specified door. The user then takes the product. A suitable latch mechanism and configuration of the storage location 201 is described in the earlier PCT application referred to above.

The preferred embodiment incorporates a recycling function as well as a vending function (see earlier PCT application). It enables the user to recycle complex items, such as toner cartridges for laser printers, etc. Step 808 enables a user to return such a recycled product to an appropriate storage location 201. This option need not be included, but is preferred. At step 809, a receipt is printed and provided through slot 211 to the user. The receipt gives details of the user transaction for his information.

If the result of the decision at step 806 is that a product is not available locally, at step 810 the display requires the user to indicate whether his order is confirmed. If the order is confirmed (by way of keyboard 208) the control unit 600 requests the order from the host device 300 by way of communications link 200, at step 811.

At step 812 receipt is printed for the user through slot 211, giving details of the delivery.

Details of user account transactions are periodically up-loaded to the host device 300 via the communications link 200 (step 813) to assist in administration of the system (814).

Control means 600 is also arranged to determine whether a product which is usually locally vended is in stock, by determining contents of the storage means 201 and/or using details from previous transactions.

In a preferred embodiment, computer diskettes may be vended from storage means 201. Storage means 201 may be in chute form, i.e., a stack of diskettes being stacked in the chute and individually dispensed. Any other arrangement may be used.

Figure 4:
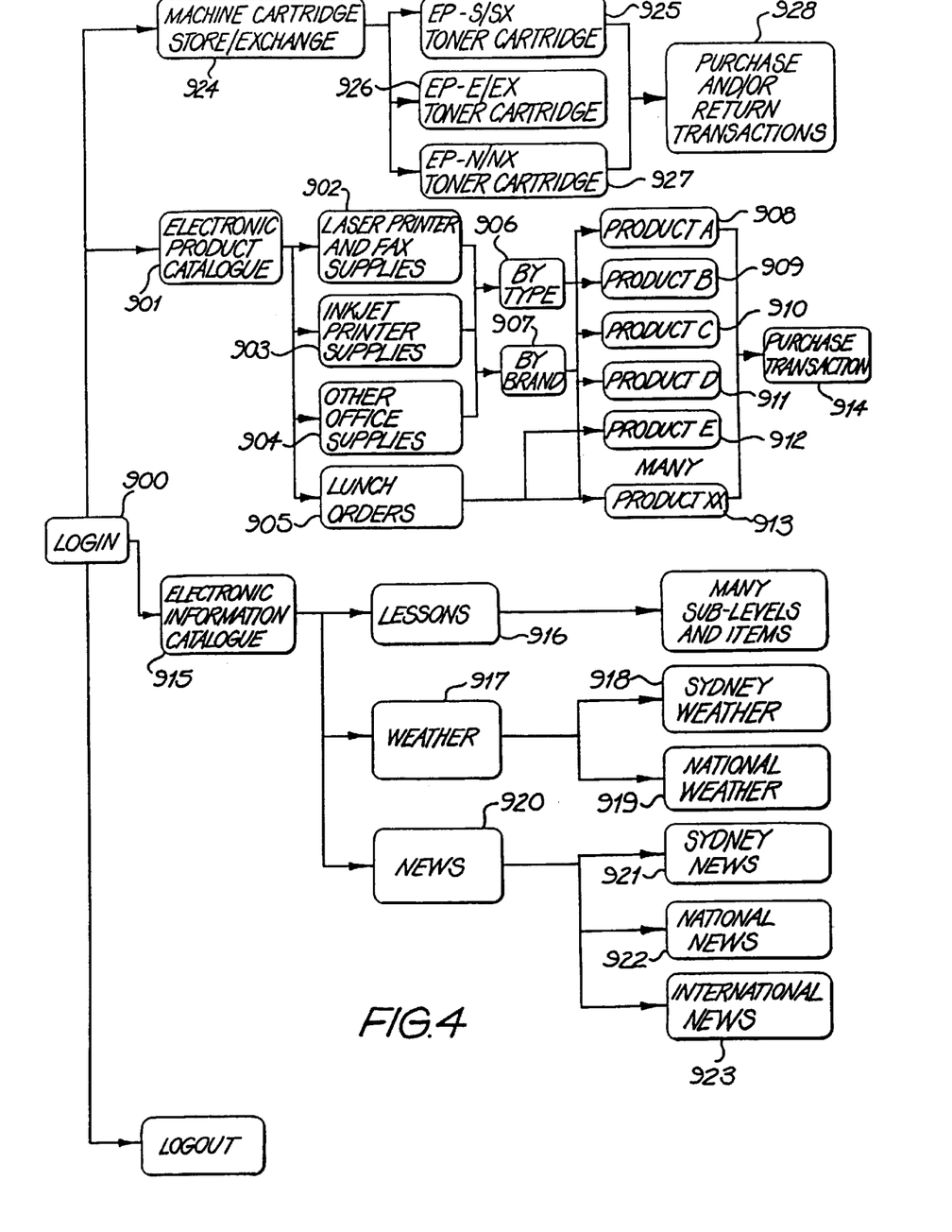
FIG. 4 is a representation of an example portion of a catalogue data base stored in memory in the device of FIG. 2.

FIG. 4 illustrates a portion of an example catalogue database stored in the memory of the electronic catalogue device 150. The database is organised in a "family tree" format. The representation shown in FIG. 4 gives an idea of how the database information will appear on the display 210 when accessed by a user. The information in the left hand columns is more generic and more detailed information is provided as one passes to the right in the diagram. Following login 900, the user will be invited to select from a menu of generic items with the heads indicated in the left hand column of FIG. 4. The user may, for example, select the "electronic product catalogue" 901 by appropriate actuation of the user interface buttons 208A. A display of the next limb in the "tree" will then appear, giving a list of items which fall within the electronic product catalogue 901. The examples given in FIG. 4 are "laser printer and fax supplies" 902, "ink jet printer supplies" 903, "other office supplies" 904 and "lunch orders" 905. Any number of items may be included in the electronic product catalogue 901. If there is not room to display the menu showing all the items of the screen 210, scroll keys 208 may be actuated by the user to scroll the screen up or down to view other menu items.

A particular user may "know" a particular product he requires in a number of ways. For example he may know of the product by type (i.e. what type of laser printer it fits) or he may know it by brand name. The database enables the user to select a particular product using his knowledge. For example, he may select by type 906 or by brand 907. If he selects by brand 907, for example, a display showing a series of brands of laser printers 902, ink jet printer supplies 903, etc, will appear. From this menu 907 he can then select a particular brand. The products available by brand will then appear on the screen 908 through 913. He can then select a particular product and proceed to the purchase transaction screen 914 into which he will enter details such as the number of products he requires. The information, together with the identity of the user (and any other information which may be required by the service provider) will then be loaded into a transaction file "see later" for communication to the host device 300.

The catalogue database may include information on any number of product/services which are available for purchase.

For example, an electronic information catalogue 915 is also provided, for the provision of services at the device 150. Services may include educational services, "lessons" 916, weather reports, "weather" 917 and "news," 918. Selection of one of these items may then prompt the appearance on the screen 210 of a menu giving many sub-items. For example, "weather" 917 selection may allow options of "Sydeny weather" 918 or "national weather" 919. Selection of "news" 920 may give options of "Sydney news" 921, "National news" 922 and "International news" 923.

The memory of the device 150 stores various service files corresponding to the service menu items available. Each service file includes data for driving the device 150 to provide the particular service. The data may be in the form of information to be produced on the display, giving a rundown of the Sydney weather, for example, may be in the form of an audio file to be reproduced audibly (e.g. verbal information giving a rundown of the Sydney weather) or may be in the form of a video file to provide visual service information. As discussed later, service files can be updated from the host device 300.

In accordance with the invention discussed in the above referenced PCT application, a "machine cartridge store/exchange" 924 function is also provided and this is also prompted by the same menu. Menu sub-items for this generic head include, for example, types of toner cartridge to be exchanged or purchased, 925 through 927. Following selection of a particular cartridge, information for a return and/or a purchase transaction is prompted 928 on the screen 210.

Once a transaction has occurred at the catalogue device 150, the host must be informed or details of the transaction so that the product can be provided (if it has not already been provided locally) and so that the user account information can be updated. The system must also enable a series of "house keeping" operations. For example, service files must be updated to ensure that the services are up-to-date. For example, "Sydney weather" 918 will need to be updated at regular intervals. Further, account information on the user database at the electronic catalogue device 150 must also be updated at regular intervals depending upon purchase information and provision of monies by the user to the service provider. It will also be necessary at times for the catalogue database to be updated to reflect availability of product/addition of new products/price changes for products.

These requirements are satisfied by data communication between each electronic catalogue device 150 and the host device 300.

Figure 5:
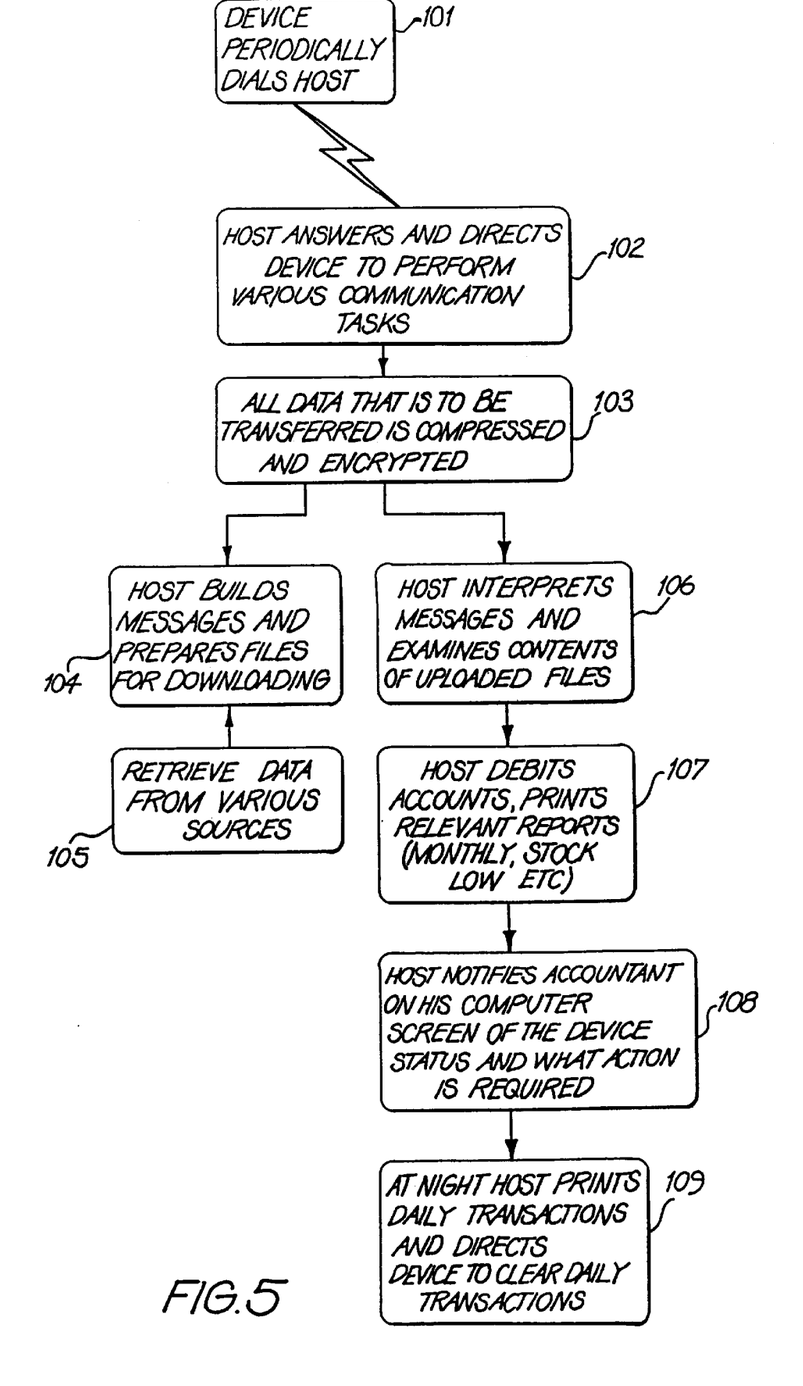
FIG. 5 is a schematic block diagram illustrating functions and communication tasks of the system.

FIG. 5 is a schematic block diagram illustrating the operation of the system.

As transactions occur, each electronic catalogue device 150 stores transaction information (identity of the user, number and type of products required, and any other information that the system deems necessary, as will be determined by the service provider) in a transaction file. The transaction file will include details of all transactions occurring at the electronic catalogue device 150 during a predetermined time period. At predetermined time intervals (for example 0600 hours, 1100 hours, 1500 hours, 2200 hours) the electronic catalogue device 150 dials up the host device 300 via the modem and uploads the transaction file including information on all transaction. Note that, where there are a plurality of electronic catalogue devices 150 serviced by a single host device 300, the dialing times for each respective device need to be staggered so that only one device is communicating with the host 300 at any one time.

At 101, therefore, the electronic catalogue device dials the host 300. At 102, the host answers and then directs various communication tasks. These communication tasks include the following:

1. The host may ask the electronic catalogue device 150 to upload transaction files. It may also ask for upload of an inventory file, which gives details of any stock remaining at the location of the electronic catalogue device (e.g. printer cartridges in compartments—see above-referenced PCT application). Any other file may also be requested. For example if the host wishes to check user details, it may request a particular user file. Such requests may be done at the prompting of the service provider.
2. It may direct downloading of any file. For example, if the service provider wishes to update a particular service file it may download a new service file to replace the service file at the electronic catalogue device 150. Similarly, it may download file for updating the catalogue database 4 with regard to products, prices, etc.
3. It may cause the electronic catalogue device to empty a file. For example, it is preferred that the transaction file be cleared at the end of each day (note that the transaction file is not cleared during every communication. For security reasons, it is considered advantageous to have the transaction file remain in the memory of the catalogue device to at least the end of the day).
4. It will terminate the communication.

All data that is to be transferred is compressed and encrypted 103 (see later).

The host prepares files for downloading 104. As discussed above, services files, user files, catalogue database, and any other files which may be provided on the electronic catalogue device 101 require updating from time to time. This is done at the host end. A host may prepare files from any number of sources of information 105. The information may be input by operation of a user interface (e.g. keyboard, mouse, etc) by a service provider. For example, a service file may be updated by entering data by way of a keyboard. Alternatively, an audio file may be entered, a visual file, etc. Entering of data may be done at any convenient time. The host may also update data automatically.

The host also examines the contents of any unloaded files (e.g. transaction files) 106. On receipt of a transaction file, the host identifies the user and the type of transaction required and prompts the service infrastructure to deliver the product and issue an appropriate debit note. The host will also examine the contents of any other files, will print relevant reports (monthly, stock low at location of electronic catalogue device, etc.) 107. Any operation of the host device which is appropriate for the services provided can be implemented, as will be realised by a skilled person.

Automatic accounting is a possibility 108 and the host may notify the accountant on his computer screen of the electronic catalogue device status and what action is required. At night the host prints daily transactions and directs the electronic catalogue device to clear the transaction file 109.

Figure 6:
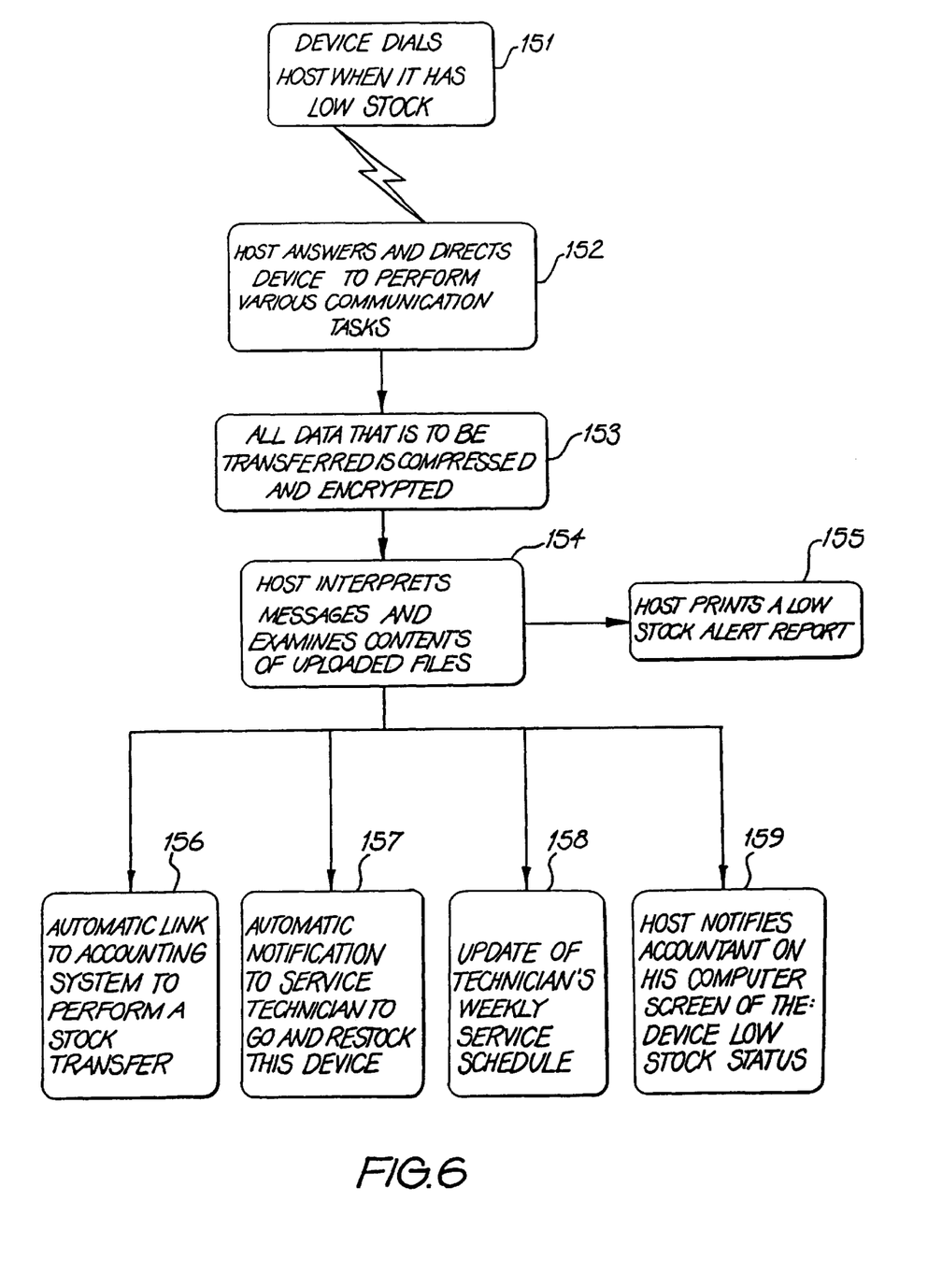
FIG. 6 is a schematic block diagram illustrating further operation of the system.

FIG. 6 is a schematic block diagram which illustrates further operation of the system, in particular in relation to the servicing and provision of items which are available locally at the electronic catalogue device location (see above-referenced PCT application).

The electronic catalogue device 150 is arranged to communicate with the host automatically when stock of a particular item on site is low 151. How low the stock has to be before communication with the host 300 occurs is a matter of choice of the service provider. As described previously, the host 300 will answer and direct the device to perform various communication tasks 152. For this particular operation, the host 300 will request an inventory and may also request uploading of the transaction file, in order to determine what stock is low and requires replacing and/or what recyclable items have been deposited and require collection. All data that is to be transferred is compressed and encrypted 153. The host examines the contents of the uploaded files 154 and prints a low stock alert report 155. A number of operations may then occur.

An automatic link is made to the accounting system to perform a stock transfer 156 (alternatively, the link may be manual, in the sense that the host alerts the accountant to the fact that a stock transfer is required).

A service technician is notified to go and restock the device 157. Again this may occur automatically or "manually", depending upon the service infrastructure.

A technician's weekly service schedule is updated 158. Where there are many electronic catalogue devices being serviced, it is advantageous that a technician who is to be restock the device and collect articles for recycling is provided with an appropriate schedule for servicing the various devices. Provision may be made for the host to automatically plan the schedule.

The host notifies the accountant on his computer screen of the device LOW STOCK status 159. The accountant then takes appropriate action.

Figure 7:
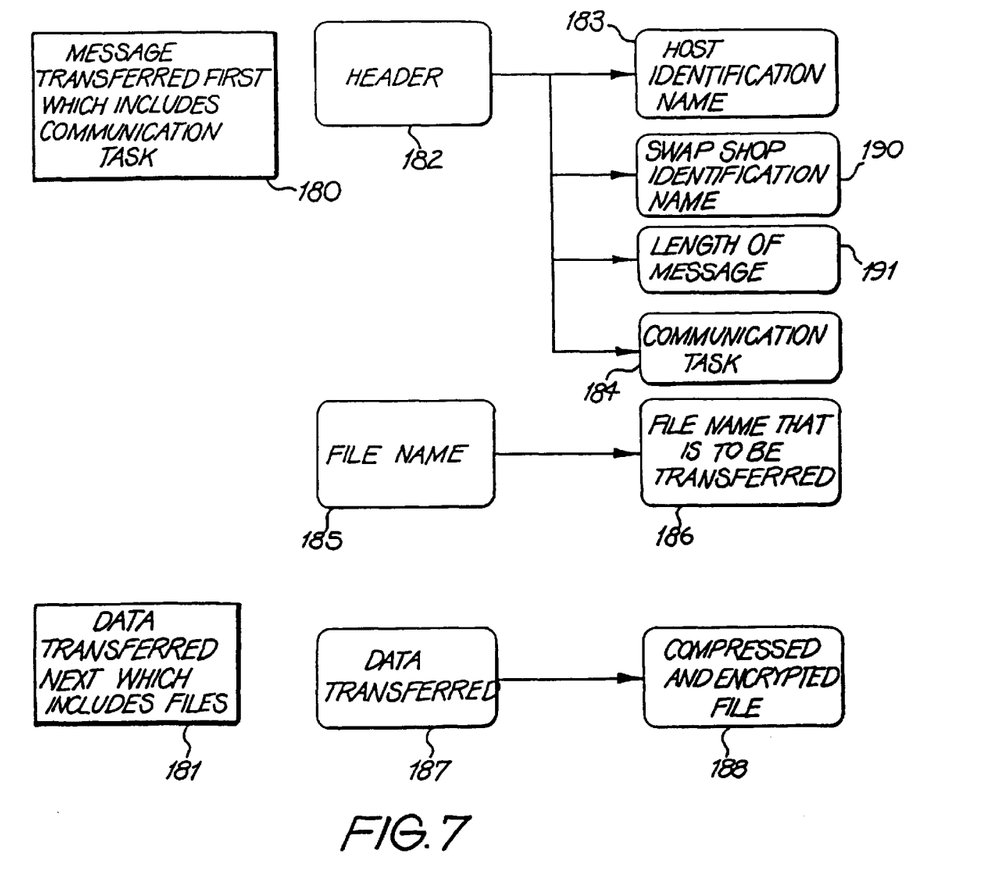
FIG. 7 is a schematic block diagram illustrating content of a typical communication exchange between a electronic catalogue device and the host device.

FIG. 7 shows a preferred format for messages containing data being transferred between the host device 300 and the electronic catalogue device 150. All messages are prepared by PKZIP protocol and are compressed and encrypted for security.

The transferred information comprises a "message" 180 followed by data 181. The message includes a header 182, which identifies 183 the particular host device (not that a large system may have more than one host device at more than one service centre), an electronic catalogue device identification name 182, gives an indication of the length of message 183 and identifies the particular communication task 184 (i.e. upload files, download files, etc.). That is then followed by a file name 185 which indicates the name of the file to be transferred 186. The header 182 is then followed by data 187 in compressed and encrypted form 188 to be transferred.

The following two examples are examples of transactions which might be made via the electronic catalogue device. The first transaction is a remote transaction and the second transaction occurs locally.

Main Milestones of a transaction (eg to purchase a chair)
1. User logs in.

The customer swipes their card, enters their secret pin code and gains access to the system.
2. User selects the electronic product catalogue option.
3. User selects the correct category (e.g. Office furniture).
4. User select the chairs sub-category.
5. User selects the chair with a high back.
6. User adjusts the quantity required and confirms the purchase is to proceed.
7. The computer registers this order on the hard disk and also on the floppy diskette, and prints a receipt.

Later on the device will send these transactions to the host control system by modem.

The host will automatically link to the company's accounting system which will automatically generate an invoice and packing slip on the warehouse manager's printer.

The warehouse manager will then known what materials are to be transferred to the Swap Shop technician for restocking (an SX cartridge from our example above), and what materials are to be dispatched by courier (a chair from our example above).

Main milestones of a transaction (eg to purchase and return an SX cartridge)

1. User logs in.

The customer swipes their card, enters their secret pin code and gains access to the system.

2. User selects the option to purchase a cartridge and return a used cartridge.
3. User selects the SX cartridge option.
4. User selects to purchase/return a cartridge.
5. The door opens and the user places the used cartridge in the compartment.
6. The user closes the door.
7. The dor opens and the user removes a new cartridge from the compartment.
8. The user closes the door and the device prints a receipt.

Although not described in the above embodiment, the electronic catalogue device may be provided with an EFTPOS facility. The K71 interface to the banking system is provided. A user will input his credit details and this will be processed by the banking system via the K71. The K71 will then signal the electronic catalogue device that the consumer has or has not got credit. The K71 signals may actuate storage location, i.e. to open a door if locally available product is required.

The banking system debits the user's account, as for standard EFTPOS transactions, and the service provider provided with appropriate monies by the banking system.

In a local transaction, when the electronic catalogue device dispenses an article, the time at which the article is dispensed is preferably recorded and the identity of the user receiving the article is recorded. Similarly, when an article is returned or deposited, the user and time is also recorded.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A vending device with a remote ordering facility for enabling a user to order gods or services from a remote location, including a memory storing a catalogue database for access by the user, the catalogue database including information on goods or services available for order, display means for displaying information from the catalogue database, communication means for communicating with a remote host device for automatically placing orders, user input means for enabling the user to select available goods or services from the catalogue database for order, and processing means for controlling operation of the device, the device further including storage means for storing goods or services for locally vending on site, the catalogue database including information on the goods or services which are available for local vending, whereby goods or services may be selected from the electronic catalogue and either vended locally from the vending device, if they are available in the vending device storage means, or ordered remotely, if they are not available locally.

2. A device in accordance with claim 1, the memory also storing a user data base, the user data base including information for identifying authorised users of the device.

3. A device in accordance with claim 2, the device being arranged to update information in the user data base in response to data communicated from the remote host device via the communication means.

4. A device in accordance with claim 1, the device including means being arranged to access user credit information to determine the credit-worthiness of a user and to deny a user order if the credit of the user is not sufficient.

5. A device in accordance with claim 4, the user data base further including user credit information for access by the device, the device being arranged to update the user credit information in response to orders placed by the user.

6. A device in accordance with claim 1, the device being arranged to update information in the catalogue data base in response to data communicated from the remote host device via the communication means.

7. A device in accordance with claim 1, the device including means arranged, responsive to operation of the user input means, to store transaction information in the memory, the transaction information including information on the identity of the user and the goods or service ordered.

8. A device in accordance with claim 7, being arranged to automatically upload stored transaction information to the host device, via the communication means, at predetermined time intervals.

9. A device in accordance with claim 1, further including an information service menu stored in the memory for access by the user, the information service menu identifying information services which are available at the device and which may be selected by the user on appropriate actuation of the user input means.

10. A device in accordance with claim 9, an information service file being stored in the device and including information service data to enable provision of an information service on selection by a user.

11. A device in accordance with claim 10, the device being arranged to update the information service file and/or the information service menu in response to data communicated from the host device via the communication means.

12. A device in accordance with claim 10, the device further including audio means for providing information in audible form, the information service file including an audio file storing audio service data for reproduction as audio information.

13. A device in accordance with claim 10, the information service file including a video file storing video service data for reproduction as video information on the display means.

14. A local vending and remote goods or services ordering and supply system, comprising a vending device with a remote ordering facility in accordance with claim 1, and a host device located at a remote location and arranged to communicate with the vending device via the communication means, to receive orders for goods or services placed via the electronic catalogue device and to process the orders.

15. A system in accordance with claim 14, the host device including a processing means for controlling the host device, a memory, a user input means and a display, the host device being arranged to process an order by receiving the transaction information via the communication means and automatically producing an invoice and delivery instruction for delivery of the goods or services to the user who generated the order at the electronic catalogue device.

16. A system in accordance with claim 14, the host device being arranged to automatically communicate with the vending device to update data stored in the memory of the vending device.

17. A device with claim 1, wherein the information in the catalogue database enables selection of goods or services by way of actuating the input means to select a category of goods or services, and then selecting an item of goods or services within the category.

18. A device with claim 17, wherein the category is brand of goods or services.

19. A device with claim 17, wherein the category is type of goods or services.

20. A device with claim 17, wherein the processing means is arranged to control the display to provide graphical images of goods or services available in the catalogue database.

21. A device in accordance with claim 1, further comprising an electronic funds transfer facility whereby a user may carry out a payment for goods or services ordered by the electronic funds transfer system crediting/debiting his account.

22. A device with claim 1, wherein the processing means is arranged to control a display to display generic information from the catalogue database via which the user can make a selection to obtain on the display more detailed information from the catalogue database.

23. A device as defined in claim 1 further comprising identification means for identifying authorized users of the device.

24. A method of providing for remote ordering and supply of goods or services, comprising the steps of providing, at a first location, a vending device with a remote ordering facility, the device incorporating a memory storing a catalogue database including information on goods or services available for order, and having input means to enable a user to select available goods or services from the catalogue database for order, providing, at a second location remote from the first location, a host device, the host device being arranged to communicate with the vending device to receive and process information relating to goods or services ordered, and providing a service infrastructure for delivering goods or services ordered to the first location, the vending device further including, at the first location, a storage means for storing goods or services for local vending, wherein the catalogue database stores information on the goods or services available for local vending, whereby the goods or services may be selected from the electronic catalogue and either vended locally from the vending device, if they are available in the vending devices storage means, or ordered remotely, if they are not available locally.

25. A method in accordance with claim 24, including the step of the host device periodically communicating with the vending device and automatically updating the catalogue database via a communication means.

26. A method in accordance with claim 24, including the further step of providing information services at the remote vending device, whereby a user can request information services via the input means.

27. A method in accordance with claim 26, including the further step of the host device providing data to the vending device to update the information services available.

28. A method in accordance with claim 24, the vending device being arranged to store user information for identifying a user of the processing device, and including the further step of the host device communicating with the vending device to update the user information.

29. A method in accordance with claim 24, including the step of enabling the vending device to be used by a plurality of different users, user information being stored in the vending device on each user.

30. A method in accordance with claim 24, including the step of positioning the vending device in a public location for access by a plurality of users.

31. A method in accordance with claim 24, including the step of providing a plurality of vending devices for communication with the host device, each processing device being positioned in a different location.

32. A vending machine comprising:
at least one storage compartment sized for storing at least one good for local vending;
a memory storing a catalogue including information indicative of at least one of a good and a service which is available for order from a location external to the vending machine;
a display device structured for displaying information from the catalogue database;
a communication device structured for communicating with a remote device for placing orders for the at least one of a good and a service which is available for order from a location external to the vending machine,
a user accessible input device for enabling the user to select at least one of: (a) the at least one good from the at least one storage compartment, and (b) the at least one of a good and a service which is available for order from a location external to the vending machine; and
a processor in communication with the input device, the memory, and the communication device, the processor being responsive to a user request to order at least one of a good or service which is available for order from a location external to the vending machine to place the order with the remote device via the communication device, wherein the vending machine is also responsive to a user purchase of a good stored in the at least one storage compartment to permit user withdrawal of the purchased good from the vending machine.

33. A vending machine as defined in claim 32 further comprising a money receiver for receiving currency from the user.

34. A vending machine as defined in claim 32 wherein the memory further stores information indicative of the current availability of the at least one good associated with the at least one storage compartment, and wherein at least one of the at least one good associated with the at least one storage compartment comprises at least one of the at least one of a good and a service which is available for order from a location external to the vending machine, such that the user may optionally instruct the vending machine to order a good associated with at least one of the at least one storage compartment from the remote location.

35. A vending machine as defined in claim 34 wherein the user may instruct the vending machine to order a good associated with at least one of the at least one storage compartment from the remote location, if the good is not available from the associated storage compartment.

36. A method of operating a vending machine comprising the steps of:
providing a plurality of storage compartments at the vending machine, each of the storage compartments being sized to store at least one good for vending;
providing a memory at the vending machine, the memory storing a catalogue database including information identifying at least one of goods and services available for purchase from a location remote to the vending machine;
displaying at the vending machine at least one of the at least one of goods and services available for purchase from the location remote to the vending machine;
accepting a user input at the vending machine;
if the user input is a purchase of a good associated with at least one of the storage compartments, permitting withdrawal of the purchased good from the vending machine; and if the user input is a request to purchase at least one of the at least one of goods and services available for purchase from the location remote to the vending machine, electronically placing an order indicative of the user request to purchase from the remote location.

37. A method as defined in claim 36 wherein at least one of the at least one good associated with the storage compartments comprises at least one of the at least one of goods and services available for purchase from a location remote to the vending machine, and wherein the step of placing an order indicative of the user request to purchase from the remote location comprises a request to purchase the at least one of the at least one good associated with the storage compartments from the remote location.

38. A method as defined in claim 37 wherein the order indicative of the user request to purchase a good associated with a storage compartment can be placed if the good is unavailable from the storage compartment.

* * * * *